US009243914B2

(12) United States Patent
Garrett et al.

(10) Patent No.: US 9,243,914 B2
(45) Date of Patent: Jan. 26, 2016

(54) CORRECTION OF NAVIGATION POSITION ESTIMATE BASED ON THE GEOMETRY OF PASSIVELY MEASURED AND ESTIMATED BEARINGS TO NEAR EARTH OBJECTS (NEOS)

(71) Applicant: Raytheon Company, Waltham, MA (US)

(72) Inventors: David G. Garrett, Tuscon, AZ (US); Chris E. Geswender, Green Valley, AZ (US); Leonard D. Vance, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/307,140

(22) Filed: Jun. 17, 2014

(65) Prior Publication Data

US 2015/0362320 A1     Dec. 17, 2015

(51) Int. Cl.
*G01S 19/45*     (2010.01)
*G01C 21/02*     (2006.01)

(52) U.S. Cl.
CPC ...................... *G01C 21/02* (2013.01)

(58) Field of Classification Search
CPC ........ G01C 21/165; B64G 1/36; G01S 19/45; G01S 11/00; F42B 15/01
See application file for complete search history.

(56) References Cited

U.S. PATENT DOCUMENTS

| 6,516,021 | B1* | 2/2003 | Abbott et al. | 375/150 |
| 2009/0122133 | A1* | 5/2009 | Hartman | 348/42 |
| 2010/0019007 | A1* | 1/2010 | Wagner | 244/3.2 |
| 2010/0164789 | A1* | 7/2010 | Basnayake | 342/357.04 |
| 2012/0232724 | A1* | 9/2012 | Janky et al. | 701/13 |

OTHER PUBLICATIONS

Brown et al., "Long Duration Strapdown Stellar-Inertial Navigation Using Satellite Tracking," NAVSYS Corporation and Naval Air Development Center, 1992 IEEE, pp. 194-201.

* cited by examiner

*Primary Examiner* — Tuan C. To
*Assistant Examiner* — Michael Fouche
(74) *Attorney, Agent, or Firm* — Eric A. Gifford

(57) ABSTRACT

Passively measured NEO bearings are used to augment an existing navigation system on-board the platform to correct the position estimate generated by the navigation system. The technology provides only a position correction based on passive NEO sightings but is applicable to a wide variety of platforms with different maneuvering profiles and update requirements. The technology directly calculates a position error based on the current position estimate and the passively measured and estimated bearings to three or more NEOs and provides the position error to the navigation system as a correction to the position estimate. The estimated bearings are computed from the current position estimate and the known orbits of the NEOs. The position error may be calculated from a single observation of multiple NEOs, allowing for frequent updates as needed and placing no restriction on platform maneuverability.

20 Claims, 4 Drawing Sheets

CORRECTION OF NAVIGATION POSITION ESTIMATE BASED ON THE GEOMETRY OF PASSIVELY MEASURED AND ESTIMATED BEARINGS TO NEAR EARTH OBJECTS (NEOS)

BACKGROUND OF THE INVENTION

1. Field of the Invention

This invention relates to navigation, and more particularly to techniques for augmenting navigation with measurements of Near Earth Objects (NEOs).

2. Description of the Related Art

Long-range navigation such as for satellites, aircraft or missiles is commonly accomplished by providing an initial position, velocity and acceleration ("PVA") and attitude, using inertial sensors on-board the platform to provide inertial measurements and integrating those measurements to update a navigation PVA and attitude over time. The inertial measurements may be provided by acceleration and angular rate sensors, which may be provided in an Inertial Measurement Unit or IMU. The navigation PVA and attitude include an error component that is bounded by an uncertainty region. The uncertainty region is dependent on several factors including the accuracy of the initial PVA and attitude, the quality of the inertial sensors (which tend to drift over time), and the accuracy of the clock. Without correction, the uncertainty region of the navigation PVA will continue to grow over time.

A Kalman Filter is typically used to reduce the noise and some of the bias errors in the integrator's estimate of PVA. The noise reduction and bias corrections a Kalman Filter provides are limited to the errors that are observable with the platform's IMU and a priori knowledge of the platform's dynamics in the form of a "motion model". Kalman filtering reduces but does not eliminate the growth in the uncertainty region.

One option to improve the navigation accuracy is to use very high precision (and high cost) inertial sensors that exhibit minimal drift over time. The integrated error remains low and external correction is unnecessary. An example of this approach is found in the Minute Man Missile. Due to the high cost of the inertial sensors this approach is not viable for many platforms.

In some systems gyroscopes are utilized to directly measure attitude. This also simplifies the integration and position estimation process. Star sighting is also used to correct attitude. This technique is passive in the sense that no information passes from the star to the platform. The platform obtains the required information through the use of internal instrumentation, typically a stellar camera or telescope. An example of a star sighting augmentation is found in the Trident Missile system.

The inertial navigation system can be augmented with other instrumentation or measurements to periodically correct the navigation PVA. GPS is often used to augment inertial navigation systems. GPS is an active system in that GPS requires data to be actively sent from an external source (GPS satellites) to a receiver on the vehicle. The GPS signals can be used to provide external measurement, separate from the internal measurement system, of true position and velocity. These are in turn provided as inputs to the Kalman Filter to correct the inertial position estimates. The active transfer of data form the GPS system to the platform is often seen as a significant limitation. Many platforms must be designed and rated to operate in a GPS denied environment.

Another technique uses celestial (star) navigation to provide a correction to latitude and longitude if the altitude is precisely known. The drawbacks to celestial navigation are that the altitude must be precisely known in order to correct position and that the error in the correction itself is at best 1 km due to the extreme distances to the stars and the difficulty in obtaining a precise altitude measurement.

Another technique to augment navigation PVA and attitude uses inertial measurements combined with near earth object (NEO) sightings. NEOs are typically other Earth-orbiting satellites, and thus are much closer to the platform than stars. The Kalman filter states are extended to include the bearings to some number of NEO's. The inclusion of the NEO data in the Kalman filter improves the accuracy of the navigation PVA and attitude. This technique described in *Long Duration Strapdown Stellar-Inertial Navigation Using Satellite Tracking*, A. Brown et. al., IEEE 1992 requires a large number of NEO sightings over a long period of time to improve the accuracy of the navigation PVA and attitude.

This approach depends on tracking the NEOs relative to inertial space. The Kalman filter develops and updates its track estimates using angle observations from an onboard stellar camera, and ephemeris orbit data for the NEO's. The Kalman filter is fed the on-board inertial measurement data, the stellar camera data, and the NEO orbital parameters and predicts the platform's navigation PVA and attitude and the NEO positions.

Filter convergence is achieved only after there is sufficient time to observe the motion of the NEOs in their orbits. In effect the technique requires sufficient time to compare the predicted or modeled motion of the NEO positions with the observed data. As each new observation is made this comparison is used to update the motion model of the NEO and platform's PVA and attitude data. When the model prediction and the observations agree within a prescribed amount the filter is said to have converged.

The Kalman filter predicts the variance in the PVA and attitude estimates. The variance estimates are a measure of how well the model prediction agrees with the observed data, and is therefore the standard measure used to determine convergence. Experiments with these methods show that the Kalman filter requires at least several minutes, often 30 minutes to hours, to converge to obtain a precision correction. A further limitation seen in these experiments was the apparent requirement to restrict the acceleration or turns of the platform while the Kalman filter converges.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an approach based solely on passive measurements to provide a correction to the navigation position estimate. The passive measurements being bearing only measurements from the platform to three or more near Earth objects (NEOs) such as might be provided by one or more stellar cameras. The correction is calculated directly from the geometry of the measured and estimated bearings to the NEOs.

In an embodiment, the platform is provided with a position estimate of the platform and the orbits of the NEOs. Bearing only measurements are passively made from the platform to each of the three or more NEOs. Bearings from the platform to each of the NEOs are estimated based on the current position estimate and the known positions of the NEOs at the current time as provided by their respective orbits. A position error is directly calculated from the geometry of the measured and estimated bearings for the three or more NEOs and used to correct the position estimate.

In an embodiment, a navigation system provides integrated PVA (position, velocity, acceleration) estimates based on inertial measurements. A Kalman filter provides position, velocity and acceleration state outputs that reduce noise and bias errors in the integrated estimates. The position error calculated directly from the geometry of the NEO bearings is fed back to the position state to correct the position state output.

In an embodiment, at least one stellar camera is configured to make a single observation comprising at least one image in at least one field-of-view (FOV) in a field of regard (FOR) that encompasses the at least three NEOs. This single observation and the processing to calculate the position error can be performed very quickly, in less than one second or a fraction of a second. Since only a single observation is required, there is no restriction on the nature of the platform motion.

In an embodiment, the position error is calculated using an iterative estimator. An estimate of an incremental position error is formed based on differences between the measured and estimated bearings and applied to the current position estimate to form an updated position estimate, which is used to update the estimated bearings to the at least three NEOs. These steps are repeated until the estimate is less than a threshold. The estimate of the incremental position error is accumulated as the steps are repeated and reported as the position error. If the alignment between the coordinate systems for the NEO orbits and the position estimate is known, the estimate can be formed directly from the difference between the measured and estimated bearings. If the alignment is unknown, the estimate is formed from the difference between measured and estimated angular separations between different pairs of NEOs. The accuracy with which the current platform attitude is known may dictate which approach is used. In some cases, both approaches may be used to compute the position error with the best result being reported to correct the position estimate.

These and other features and advantages of the invention will be apparent to those skilled in the art from the following detailed description of preferred embodiments, taken together with the accompanying drawings, in which:

DETAILED DESCRIPTION OF THE INVENTION

Although known techniques for using near Earth object (NEO) sightings provide refinements of both platform PVA and attitude estimates, the usefulness is limited to low maneuvering platforms that allow for very long observations intervals and require infrequent updates.

The present invention augments an existing navigation system on-board the platform to correct the position estimates generated by the navigation system. The technology provides only a position correction based on passive NEO sightings but is applicable to a wide variety of platforms with different maneuvering profiles and update requirements. We sacrifice direct corrections to other estimates e.g. velocity, acceleration and attitude in exchange for a timely and precise correction to the position estimate. The technology directly calculates a position error based on the passively measured and estimated bearings to three or more NEOs and provides the position error to the navigation system as a correction to the position estimate. The passively measured bearings may be provided by, for example, a stellar camera. The estimated bearings are computed from the current position estimate and the known orbits of the NEOs. The raw bearing measurements are not fed back to and processed by the navigation system. The position error may be calculated from a single observation of multiple NEOs, allowing for frequent updates as needed and placing no restriction on platform maneuverability.

The correction to the position estimate may indirectly improve the velocity and acceleration estimates. By applying a sequence of measurements over time, conventional navigation can be used to improve the platform's velocity estimates. NEO's in more than one direction are used to reduce the effect of clock, bearing angle and NEO position errors. The correction for position error has no effect on the attitude estimate. If required, other known techniques such as provided by a stellar camera can be used to provide attitude correction. The technology can be used with endoatmospheric, exoatmospheric and terrestrial platforms such ballistic missiles, tactical missile, UAV's, and land or water borne vehicles where high precision navigation is desired. The technology can be used with NEOs such as Earth orbiting satellites whose orbits are precisely known.

Figure 1:
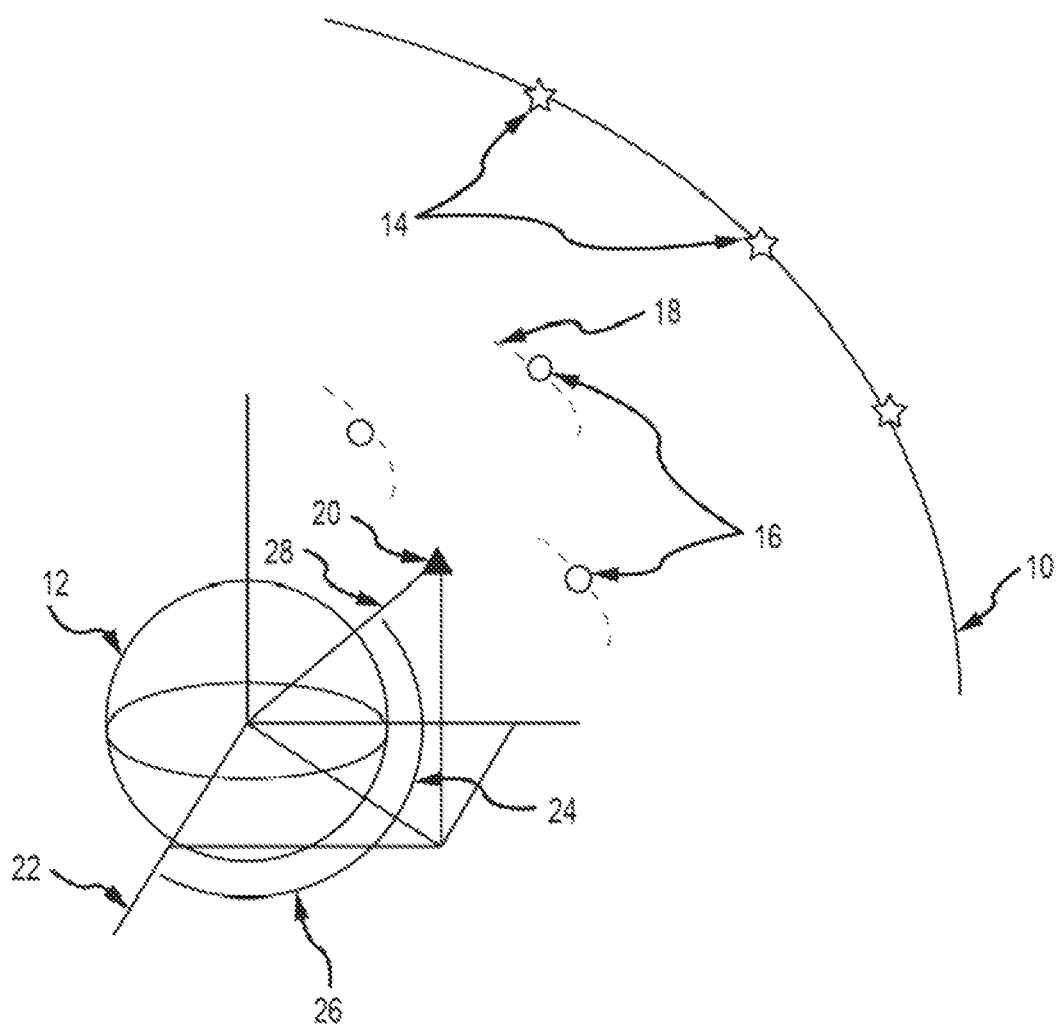
FIG. 1 is a diagram of a platform positioned in a celestial sphere.

Referring now to the drawings, FIG. 1 illustrates the general geometry problem in which a celestial sphere 10 includes the Earth 12 and the stars 14 above. A number of NEOs 16 orbit the Earth along respective orbits 18. The NEOs are typically satellites in low-Earth, medium-Earth or geostationary orbit about the Earth. Earth's moon is another example of a NEO. The orbits of the NEOs are provided in a three-dimensional coordinate system such as the traditional Keplerian elements or orbital state vectors in an inertial frame of reference with an arbitrary epoch.

A platform 20 such as a satellite, aircraft or missile is positioned above the Earth 12. The platform's navigation system knows the platform's approximate position in a three-dimensional coordinate system 22 such as given by latitude 24, longitude 26 and altitude 28. Typically, the navigation system will also know the platform's approximate velocity, acceleration and attitude as well. Any number of three-dimensional coordinate systems may be used to represent PVA and attitude.

In an embodiment, the platform's navigation system is provided with an initial PVA (position, velocity and acceleration) and attitude. Inertial sensors such as in an IMU provide inertial measurements of linear acceleration and angular rates. The navigation system integrates the inertial measurements to update the navigation PVA and attitude over time. The navigation PVA and attitude include an uncertainty region that is dependent on several factors including the accuracy of the initial PVA and attitude, the quality of the inertial sensors (which tend to drift over time), and the accuracy of the clock. Without correction, the uncertainty region of the navigation PVA will continue to grow over time.

The navigation system typically includes a Kalman Filter to reduce the noise and some of the bias errors in the integrator's estimate of PVA and attitude. The noise reduction and bias corrections a Kalman Filter provides are limited to the errors that are observable with the platform's IMU and a priori knowledge of the platforms dynamics in the form of a "motion model". Kalman filtering reduces but does not eliminate the growth in the uncertainty region. Periodic corrections to the PVA and attitude may be required to reset or reduce the uncertainty region. For example, inertial measurements might be take at 600 samples per second and accumulated in the KF that is updated at 30 samples per second. A correction to the position estimate may be provided at a regular interval of say 1 sample per second or it may be provided when the uncertain region grows to a certain size.

Figure 2:
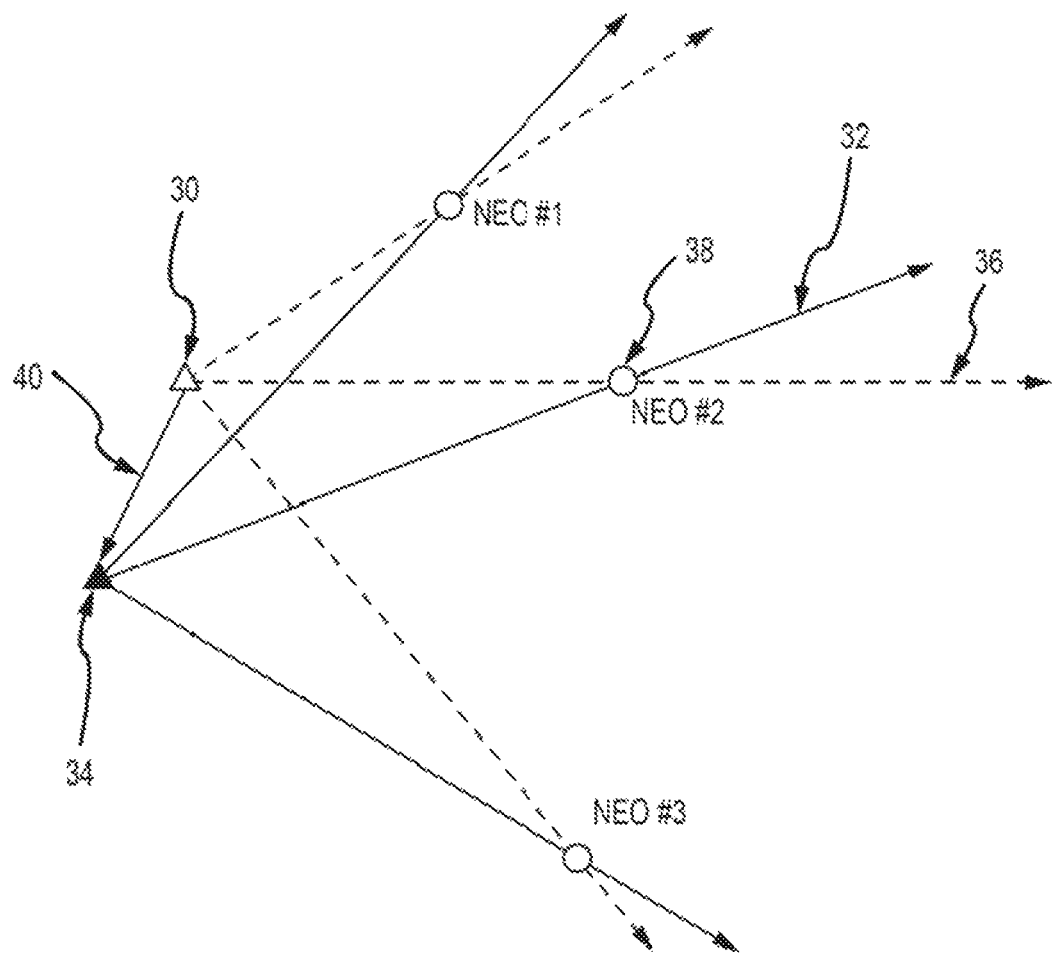
FIG. 2 is a diagram illustrating a direct calculation of platform position error from the geometry of measured and estimated bearings for three or more NEOs.

The geometry problem solved by the present invention to provide a correction to the position estimate based solely on passive measurements is illustrated in FIG. 2. Our approach requires the current position estimate 30 of the platform, bearing only measurements 32 to at least three NEOs; NEO #1, NEO #2 and NEO #3, the orbits of the NEOs and an external clock signal that synchronizes the position estimate, bearing measurements and orbit data. The current position estimate 30 is provided by the navigation system. The bearing only measurements 32 are suitably provided by (or derived from) one or more stellar cameras on the platform. The stellar cameras may also be used to provide periodic attitude correction. These measurements 32 are from the platform's true position 34 to each of the NEOs. The NEO orbits are available from various databases and are loaded onto the platform and synchronized to the clock signal. Depending on the source of the orbit information, the orbits may have an accuracy of any where from a few centimeters to hundreds of meters.

Our approach calculates a bearing estimate 36 from the current position estimate 30 to each of the known positions 38 of the NEOs from their orbits and the external clock signal. The difference between the measured bearings 32 and the estimated bearings 36 results in a mathematical expression (e.g. a statistical estimator) that can then be solved for the platform's position error 40. Position error 40 is directly calculated from the geometry of the measured and estimated bearings to the three or more NEOs. Since the range to the NEO is not available from purely passive, i.e. bearing only measurements, the solution for the error correction is not unique if only one or two NEO's are used. By using three NEO's a unique solution for the position error can be obtained, and by using four or more NEO's a statistical, minimum variance, solution for the position error 40 can be obtained.

The position error 40 is fed back to the navigation system as a correction for the current position estimate 30. More particularly, the position error 40 may be fed back to the position state of the Kalman Filter to provide a direct correction to the position state output.

The position error 40 will itself have an error component that is bounded by an uncertainty region that is essentially set by the accuracy of the NEO orbit data and the accuracy of the external clock signal. This will in turn influence to what extent the uncertainty region of the position estimate 30 is reset or reduced. More particularly, this will influence the variance of the position state within the covariance matrix of the Kalman filter. For example, if the orbit data is known within a few centimeters the error component of the position estimate could be reset to within a few centimeters. In an embodiment, the uncertainty region of the position error is reduced to less than 10 meters for each correction. In another embodiment, the uncertain region of the position error is reduced to less than 100 cm for each correction.

Our approach only requires the availability of a position estimate, how the position estimate is obtained does not affect the direct calculation of the position error based on the geometry of the measured and estimated bearings to the NEOs. Modern navigation systems provide the position estimate based on a combination of integration of inertial measurements and a Kalman filter but this is not required for our approach.

In the absence of a navigation system position estimate, the position estimate only needs to be sufficiently accurate to resolve the ambiguity between two possible solutions. One of the solutions will be "close" to the Earth and the other will be "far" from the Earth. In this method if the position estimate used in "near" the Earth the solution closest to the Earth will be found. Taking the average of the vectors from the center of the Earth to the surface of the Earth pointing to each NEO will produce a position estimate that will when used in this method produce the correct position for a platform near the Earth. This is how an inexpensive GPS receiver provides a position estimate.

Figure 3:
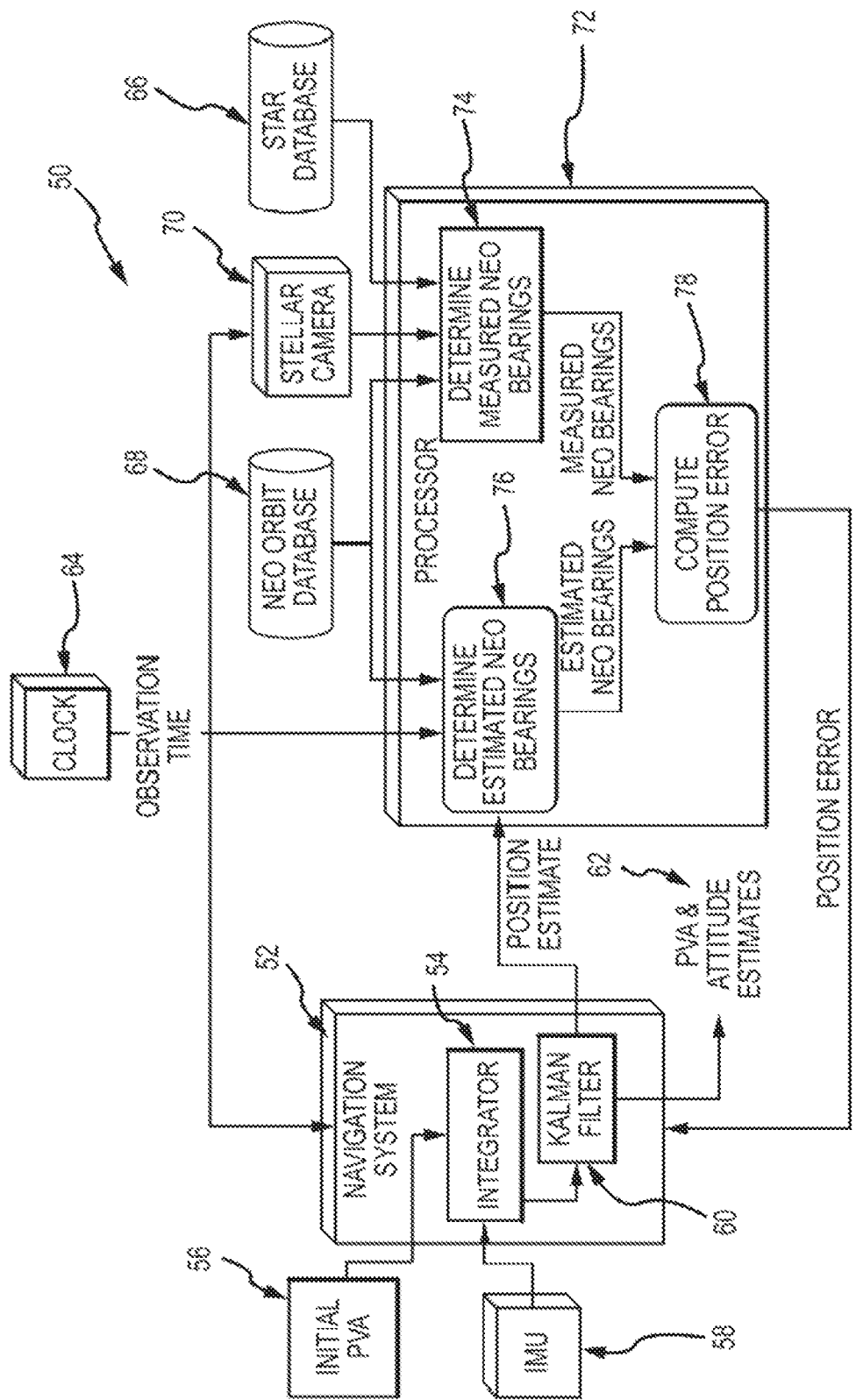
FIG. 3 is a notional block diagram of an embodiment of a celestial navigation system in which a conventional navigation system is augmented with a position error correction based solely on bearing measurements to at least three NEOs.

As shown in FIG. 3, an embodiment of a NEO-augmented navigation system 50 for use on a platform comprises a navigation system 52 that provides a current position estimate for the platform. As shown, navigation system 50 includes an integrator 54 that receives initial PVA and attitude 56 and inertial measurements from an IMU 58 and integrates them to provide integrated PVA and attitude estimates that are provided to a Kalman Filter 60 that reduces the noise and some of the bias errors in the integrator's estimate of PVA and attitude.

Kalman Filter 60 uses estimates of position, velocity, attitude, accelerations and angular rates to compute a state transition matrix that is a function of differential equations that are a function of time, and uses the state transition matrix to project the covariance matrix to the time of the next filter iteration so that the PVA and attitude are updated at the filter rate. The Kalman filter may include other states such as camera gimbal angles, line of sight angles, range and so forth. To produce the corrections and correct the covariance, the Kalman Filter uses the covariance matrix to compute a Kalman filter gain. The Kalman filter gain and the three-dimensional position residual are used to estimate the errors (uncertainty regions) in the position, velocity, and attitude estimates and IMU compensation terms. These errors are used to compute corrections to be incorporated to the corresponding estimates in the PVA and attitude integration. The Kalman filter gain is also used to correct the covariance matrix to reflect the change in uncertainty as a result of incorporation of the corrections from the position residual. The Kalman filter outputs the current PVA and attitude estimates 62 at a filter update rate that is synchronized to a clock signal from a clock 64.

To provide a correction to the position estimate, an embodiment of the NEO-augmented navigation system 50 further comprises a star database 66, a NEO orbit database 68, one or more stellar cameras 70 and one or more computer processors 72. A correction may be generated at regular intervals e.g. once per second or asynchronously in response to a request from the navigation system. The navigation system may, for example, issue the request when the variance (uncertainty region) of the position estimate reaches a specified threshold.

The stellar camera(s) 70 and computer processor(s) 72 are configured to passively acquire bearing only measurements from the platform to each of three or more NEOs. At a minimum, the camera provides an image with a certain field-of-view (FOV), which is at a known relationship to the attitude of the platform. The processing required to extract the bearing only measurements from the image may be partially or wholly located with the stellar camera. In this embodiment, the stellar camera is configured to identify bright spots in the image e.g. stars or NEOs and return a list of objects and bearing measurements to each object. Computer processor 72 is configured to process this list, NEO orbit data from database 68 and star position data from database 66 to determine measured NEO bearings (step 74). An equivalent embodiment of a stellar camera may comprise a telescope and a visible band detector.

At the current time provided by the clock signal, computer processor 72 uses the current position and attitude estimates to determine the pattern of stars and NEOs that should lie in the camera's FOV. The computer processor 72 correlates this known pattern to the list of objects and bearing measurements provided by the camera to identify which objects are NEOs, what specific NEO the object is and the bearing measurement from the true position of the platform at the current time.

To acquire bearing measurements to at least three NEOs, acquisition may be timed such that the navigation system knows a priori that at least three NEOs will be seen in the FOV. Alternately, the platform may have multiple stellar cameras with different FOV. Together the multiple images provide at least three measurements. Alternately, the FOV of a single camera could be scanned over a larger FOR to acquire at least three NEOs. The measurement time for the camera is on the order of 10 ms. The total processing time to determine the position error to correct the position estimate is largely dependent on this measurement time and computational speed of the processors, in most cases is less than 1 second.

The computer processor 72 is configured to determine estimated NEO bearings for at least three of the measured NEOs (step 76). At the current time provided by the clock signal (the same time as the bearing measurements), computer processor 72 uses the orbits of the measured NEOs to compute their positions at the current time. Given the position estimate of the platform and the positions of the NEOs, the computer processor can compute bearing estimates from the platform to at least three of the measured NEOs.

The difference between the measured NEO bearings and the estimated NEO bearings results in a mathematical expression (e.g. a statistical estimator) that can then be solved for the platform's position error given the current position estimate (step 78). The computer processor 74 is configured to solve the mathematical expression to produce a position error that is reported back to the navigation system 52, and more particularly to the position state of Kalman Filter 60 to correct the position estimate and to reduce the uncertainty region of the corrected position estimate.

In an embodiment, the mathematical expression is solved using an iterative estimator. The processor forms an estimate of an incremental position error based on differences between the measured and estimated bearings and applies the error estimate to the current position estimate to form an updated position estimate, which is in turn used to update the estimated bearings to the at least three NEOs. The processor repeats these steps until the error estimate is less than a threshold. The processor accumulates the estimate of the incremental position error as the steps are repeated and reports the accumulated error as the position error.

There are at least two embodiments of the iterative estimator for processing the bearing measurements to the NEOs to directly calculate the position error. A first embodiment is generically applicable whether the alignment of the three-dimensional coordinate system of the position estimate to the three-dimensional coordinate system of the NEO orbit data is known or not (e.g. regardless of the accuracy of the current attitude estimate). Although of general applicability, this approach is particularly useful when navigation system's attitude estimate is not sufficiently accurate to align the position estimate to the NEO orbital data. A second embodiment is specifically applicable when this alignment is known. The stellar camera can be used to image the star field to provide a precise attitude estimate to align the position estimate to the NEO orbital data. In certain geometries the second approach has proven to provide more accurate results. In some cases, the system may solve the iterative estimator using both approaches and report the most accurate position error back to the navigation system.

The first embodiment processes an angular separation of pairs of NEOs to remove the alignment uncertainty. The stellar camera is used to determine the angular separation of pairs of NEO's. The angular separation is also calculated using the estimated position of the navigator and the orbital data of the NEO's. The difference between the measured angular separations and the estimated angular separations are then used to form a least squares estimator for the position error in the estimated position according to equation (1).

$$\epsilon_{ij} = \|\theta_{ij} - F(r_{estimate} + \delta r, r_{neo(i)}, r_{neo(j)})\| \quad (1)$$

where $\theta_{ij}$ is the measured angle between NEO i and NEO j where i and j are the indices of the NEOs in a defined pair. The function $F(r_{estimate} + \delta r, r_{neo(i)}, r_{neo(j)})$ computes an estimated angle between NEO i and NEO j from the current position estimate of the platform $r_{estimate}$, the position error $\delta r$, and positions of the NEO's, $r_{neo(i)}$ and $r_{neo(j)}$ from the known orbits and current time. The value of $\delta r$ is found by solving:

$$\sum_{i,j;i<j} \epsilon_{ij}^2 = 0,$$

when three NEOs are used or finding $$\min_{\delta r} \sum_{i,j;i<j} \epsilon_{ij}^2$$

in a least square sense, when four or more NEO are used. In either case a solution, $\delta r$, is found by solving $$\sum_{i,j;i<j} \epsilon_{ij} \frac{\partial}{\partial \delta r} \epsilon_{ij} = 0,$$

where the notation $$\frac{\partial}{\partial \delta r}$$

represents the partial derivative with respect to each component of $\delta r$. Since $$\epsilon_{ij} \frac{\partial}{\partial \delta r} \epsilon_{ij}$$

is non-linear, me solution is found by first linearizing $$\varepsilon_{ij} \frac{\partial}{\partial \delta r} \varepsilon_{ij},$$

and solving for δr iteratively.

Figure 4:
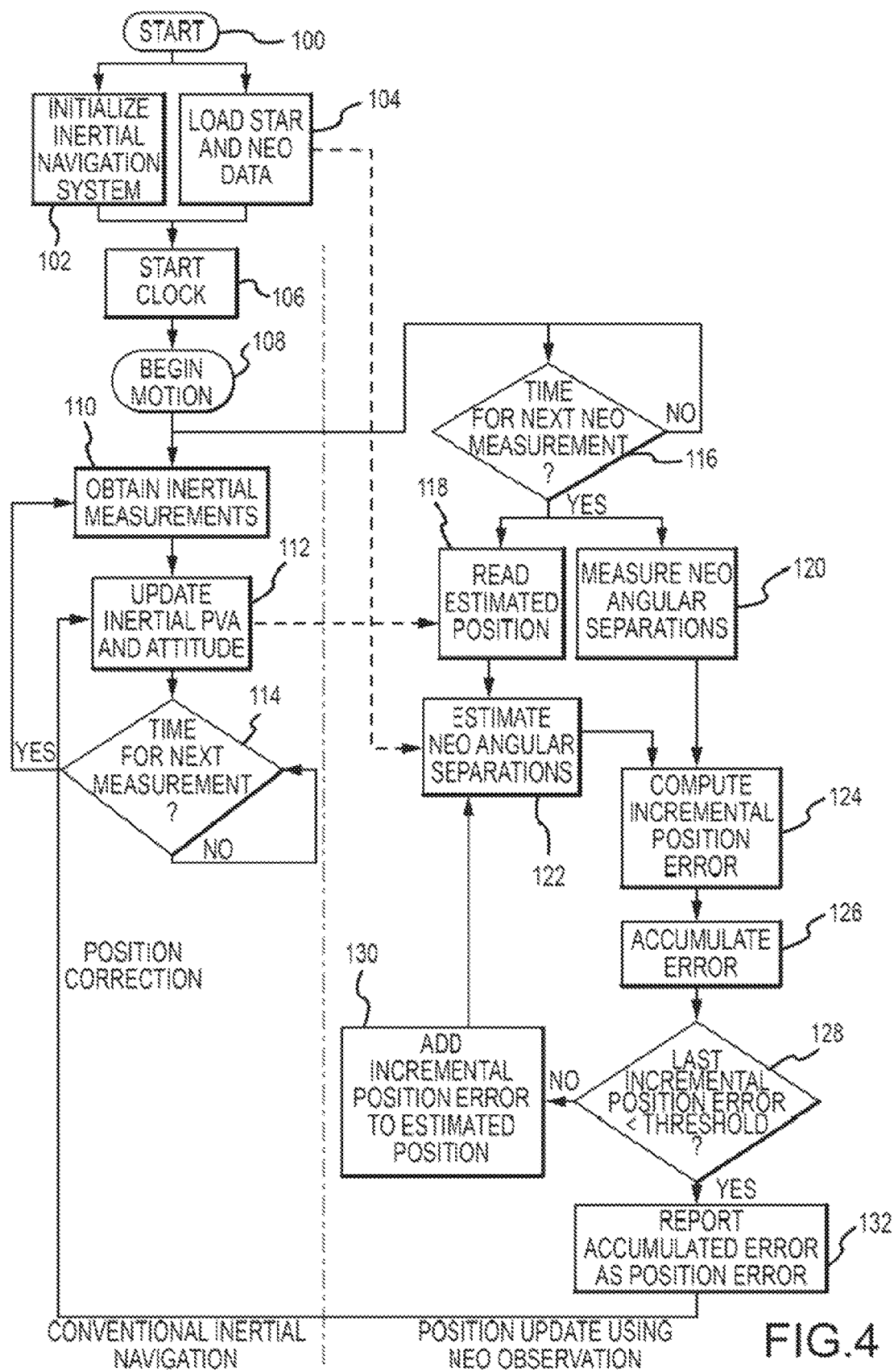
FIG. 4 is a flow diagram of an embodiment in which a measured angular separation of different pairs of NEOs is used to compute the position error.

FIG. 4 illustrates an embodiment of the process for generating an inertial position estimate and for iteratively solving the estimator of equation (1) to provide corrections to the position estimate. The navigation process starts at step 100 by initializing the inertial navigation system step 102 with initial PVA and attitude estimates and loading the star and NEO orbit databases step 104. The clock starts at step 106 and platform motion begins at step 108. The inertial navigation system obtains inertial measurements of platform motion in step 110 and updates the inertial PVA and attitude estimates in step 112 by way of an integrator and Kalman filter for example. The process repeats step 114 when it is time for the next inertial measurement in step 110. The Kalman filter operates at a lower update rate than the inertial measurements in order to reduce measurement noise.

The inertial navigation system can initiate a correction on a periodic schedule e.g. every X seconds or when the uncertainty region of the position estimate reaches a certain condition (e.g. the variance of the position estimate exceeds a threshold). Either way, when the time for the next NEO measurement is indicated in step 116, the current position estimate is read from the navigation system in step 118 and angular separations of pairs of NEOs are measured for at least three different pairs in step 120. Based on the current position estimate and the true positions of the NEOs from the orbit data, an angular separation is estimated for each pair of NEOs in step 122. The difference between the measured angular separations and the estimated angular separations provides an incremental position error in step 124. This error is accumulated form an accumulated error (δr) in step 126. If the incremental position error is not less than a threshold in step 128, the incremental position error is added to the current position estimate to update the estimate in step 130. The updated position estimate is used to update the estimated angular separation for each pair of NEOs in step 122. These steps are repeated until the incremental position error is less than the threshold in step 128. At this point the accumulated error (δr) is reported back to the navigation system in step 132 to provide a correction to the position estimate in step 112.

The accumulated error (δr) has an associated uncertainty region that is primarily a function of the accuracy of the NEO orbits and the clock signal. This uncertain region will determine the reduction or reset of the uncertainty region of the corrected position estimate. In a Kalman Filter, the accumulated error is provided as an input to the position state and the uncertainty region is incorporated into the covariance matrix to reduce or reset the variance of the position estimate output by the position state.

The second embodiment directly processes the measured bearings to the NEOs. The bearings are also calculated estimated from the estimated position of the navigator and the orbital data of the NEO's. The differences between the measured bearings and the estimated bearings are then used to form a least squares estimator for the position error in the estimated position according to equation (2).

$$\epsilon_i = \|\mu_i - G(r_{estimate} + \delta r, r_{neo(i)})\| \quad (2)$$

where $\mu_i$ is the measured bearing to NEO i. The function $G(r_{estimate} + \delta r, r_{neo(i)})$ computes an estimate of the bearing to NEO i from the estimated position of the platform $r_{estimate}$, the position error δr, and positions of the NEOs $r_{neo(i)}$. The value of δr that minimizes $\epsilon_i$ is the position error correction. δr is found by using non-linear least squares techniques as described for equation (1). The process for iteratively solving the estimator of equation (2) is identical to the process illustrated in FIG. 4 for iteratively solving the estimator of equation (1) except that the estimator forms the incremental position error between measured and estimated NEO bearings rather than measured and estimated angular separations of NEO pairs.

The accuracy obtained by either embodiment is dependent on the accuracy and resolution of the stellar camera and the accuracy of the orbital parameter of the NEOs used. Further since the orbital parameters, i.e. position is a function of the time the accuracy of the clock used to determine the NEO position from the ephemeris data also limits the accuracy of this method.

In both embodiments the stellar camera is required to observe multiple NEOs. In some applications, the required FOR to capture multiple NEOs may require either multiple cameras or apertures to simultaneous observe the NEOs or measurements with a single camera, separated in time with an intervening attitude change to observe multiple NEOs. The multiple camera or aperture approach is the equivalent of a single camera measurement and can be directly used. In the case where an intervening maneuver is required between the observation of the NEOs the NEO position in the camera coordinates of the each NEO observation must be propagated to the time of the last NEO observation. The final accuracy of the method is also limited in this case by the accuracy of the clock and the short term accuracy of the inertial measurement data used to propagate the camera frame of reference to the last NEO observation time, position and attitude.

Both the angular separation and the bearing measurements can be transformed to develop an alternate variation of this subject method. Examples of such transformation include developing the least square estimator from the cosine of the angular separation in the first embodiment or the cross product of the directions in the second embodiment. While such transformations have some advantage in practical implementation terms they represent variations in the implementation of the method and are not unique methods.

In systems where both the angular separations and NEO bearings can be measured, the least square estimators formed for each type of measurement can be combined to produce an extended least square estimator. This can also be done with a transform of the measurements. Such an extension provides some additional implementation advantage, such a faster convergence of the least squares estimator.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A method of refining a position estimate for a platform, comprising:
  providing the platform with the orbits of near Earth objects (NEOs);
  providing a position estimate of the platform;
  using a stellar camera to passively make bearing only measurements from the platform to each of three or more NEOs;

estimating a bearing from the platform to each of the three or more NEOs from the current position estimate of the platform and known positions of the NEOs from their orbits;

directly calculating a position error of the platform from the geometry of the measured and estimated bearings for the three or more NEOs; and using the position error to correct the position estimate for the platform.

2. The method of claim 1, wherein directly calculating the position error comprises forming an estimate of an incremental position error based on differences between the measured and estimated bearings, accumulating the estimate of incremental position error, applying the estimate of incremental position error to the current position estimate to form an updated position estimate, using the updated position estimate to update the estimated bearings to the at least three NEOs, repeating these steps until the estimate of the incremental position error is less than a threshold and reporting the accumulated position error as the position error.

3. The method of claim 2, wherein the NEO orbits are provided in a first three-dimensional coordinate system and the position estimate is provided in a second three-dimensional coordinate system, wherein the alignment of the first and second three-dimensional coordinate systems is unknown, further comprising:

measuring an angular separation between two bearing measurements;

determining an angular separation between two estimated bearings; and forming the estimate based on differences between the measured and estimated angular separations.

4. The method of claim 2, wherein the NEO orbits are provided in a first three-dimensional coordinate system and the position estimate is provided in a second three-dimensional coordinate system, wherein the alignment of the first and second three-dimensional coordinate systems is known, wherein the estimate is formed from the difference between the measured and estimated bearings.

5. The method of claim 1, wherein the step of providing the position estimate comprises:

providing initial conditions including an initial position estimate of the platform;

providing inertial measurements of platform motion; and integrating the initial position estimate and inertial measurements to provide an integrated position estimate.

6. The method of claim 5, further comprising:

providing the integrated position estimate as an input to a Kalman Filter, said Kalman filter including at least one position state that generates a position state output that reduces noise and bias errors in the integrated position estimate;

providing the position error as an input to the Kalman filter to correct the position state output.

7. The method of claim 6, wherein the Kalman filter includes at least one other state, said method only providing the position error as an input to the position state to directly correct the position state output.

8. The method of claim 6, wherein the initial conditions further include at least an initial velocity estimate, an initial acceleration estimate and an initial attitude estimate, wherein the inertial measurements are integrated to provide integrated velocity, acceleration and attitude estimates, wherein the Kalman filter further includes at least velocity, acceleration and attitude states that generate velocity, acceleration and attitude state outputs that reduce noise and bias errors, said method only providing the position error as an input to the position state to directly correct the position state output.

9. The method of claim 1, wherein the platform is a missile.

10. The method of claim 1, wherein the NEOs are Earth orbiting satellites.

11. The method of claim 1, wherein the step of passively making bearing only measurements to the at least three NEOs comprises taking a single image in a single field-of-view (FOV) that encompasses the at least three NEOs and processing the single image to extract the measured bearings to the at least three NEOs.

12. The method of claim 1, wherein the step of passively making bearing only measurements to the at least three NEOs comprises simultaneously taking multiple images in multiple field-of-view (FOV) that together encompass the at least three NEOs and processing multiple images to extract the measured bearings to the at least three NEOs.

13. The method of claim 1, wherein the step of passively making bearing only measurements to the at least three NEOs comprises taking an image in a field-of-view (FOV) that is scanned over a larger field-of-regard (FOR) that encompasses the at least three NEOs and processing the multiple images to extract the measured bearings to the at least three NEOs.

14. The method of claim 1, wherein the steps of passively making the bearing only measurements, estimating the bearings to the three or more NEOs and directly calculating the position error to correct the position estimate take less than one second.

15. A platform navigation system, comprising:

a database including orbits of near Earth objects (NEOs);

inertial sensors configured to provide inertial measurements of platform motion;

an integrator that integrates initial conditions including an initial position estimate of the platform and the inertial measurements to generate an integrated position estimate for the platform over time;

a Kalman filter configured to received the integrated position estimate, said Kalman filter including at least one position state that generates a position state output that reduces noise and bias errors in the integrated position estimate;

at least one stellar camera configured to make passive bearing only measurements from the platform to each of three or more NEOs over an observation interval; and a processor configured to estimate a bearing from the platform to each of the three or more NEOs from the current position estimate of the platform and known positions of the NEOs from their orbits, directly calculate a position error of the platform from the geometry of the measured and estimated bearings for the three or more NEOs, and provide the position error to the Kalman filter as a correction to the position state output.

16. The platform of claim 15, wherein the processor is configured to directly calculate the position error by forming an estimate of an incremental position error based on differences between the measured and estimated bearings, accumulating the estimate of incremental position error, applying the estimate of incremental position error to the current position estimate to form an updated position estimate, using the updated position estimate to update the estimated bearings to the at least three NEOs, repeating these steps until the estimate of the incremental position error is less than a threshold and reporting the accumulated position error as the position error.

17. The platform of claim 16, wherein the NEO orbits are provided in a first three-dimensional coordinate system and the position estimate is provided in a second three-dimensional coordinate system, wherein the alignment of the first and second three-dimensional coordinate systems is unknown, wherein the stellar camera is configured to measure an angular separation between two bearing measurements and the processor is configured to determine an angular separation between two estimated bearings and form the estimate based on differences between the measured and estimated angular separations.

18. The platform of claim 16, wherein the NEO orbits are provided in a first three-dimensional coordinate system and the position estimate is provided in a second three-dimensional coordinate system, wherein the alignment of the first and second three-dimensional coordinate systems is known, wherein the processor is configured to form the estimate from the difference between the measured and estimated bearings.

19. The platform of claim 15, wherein the at least one said stellar camera is configured to make a single observation comprising at least one said image in at least one field-of-view (FOV) in a field of regard (FOR) that encompasses the at least three NEOs.

20. The platform of claim 15, wherein the at least one stellar camera and processor are configured to passively make the bearing only measurements, estimate the bearings to the three or more NEOs and directly calculate the position error to correct the position estimate in less than one second.

* * * * *